United States Patent [19]

Sheen

[11] Patent Number: 5,004,054

[45] Date of Patent: Apr. 2, 1991

[54] ELECTRIC DRILL WITH SPEED AND TORQUE CONTROL

[75] Inventor: Dony Sheen, Taya Hsiang, Taiwan

[73] Assignee: Regitar Power Tools Co., Ltd., Taichung Hsien, Taiwan

[21] Appl. No.: 547,033

[22] Filed: Jul. 2, 1990

[51] Int. Cl.$^5$ .............................. B23Q 5/00; F16D 7/06
[52] U.S. Cl. ..................................... 173/12; 81/473; 464/35
[58] Field of Search ................ 173/5, 12, 18, 47, 163; 81/467, 469, 473; 464/39, 35

[56] References Cited

U.S. PATENT DOCUMENTS 4,671,364  6/1987  Fink et al. ........................ 173/12
4,823,885  4/1989  Okumura ........................... 173/12
4,880,064  11/1989 Willoughby et al. ............... 173/12

Primary Examiner—Hien H. Phan
Assistant Examiner—Willmon Fridie, Jr.
Attorney, Agent, or Firm—Morton J. Rosenberg; David I. Klein

[57] ABSTRACT

This invention relates to an electric drill with speed and torque control and in particular to one which utilizes a single adjuster ring to control output speed and torque. When the adjuster ring is turned, the transmission axle will engage with another gear thereby changing the output speed. Further, in the meantime, the force exerted on the driven gear will be changed to adjust the output torque. The clutch and the driven gear are engaged by means of steel balls received in the recesses thereof.

2 Claims, 5 Drawing Sheets

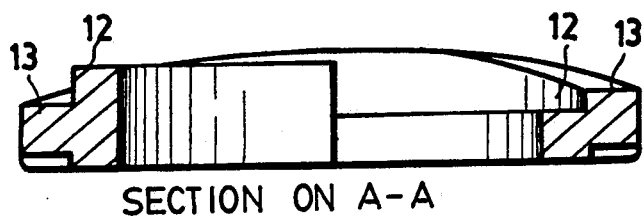
FIG. 6
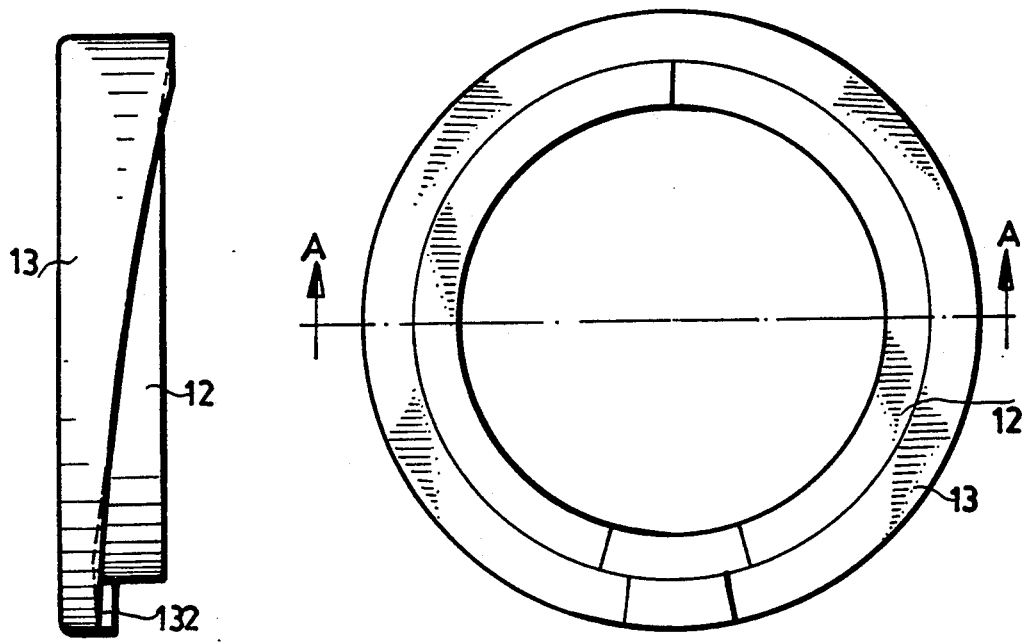
FIG. 5
FIG. 8
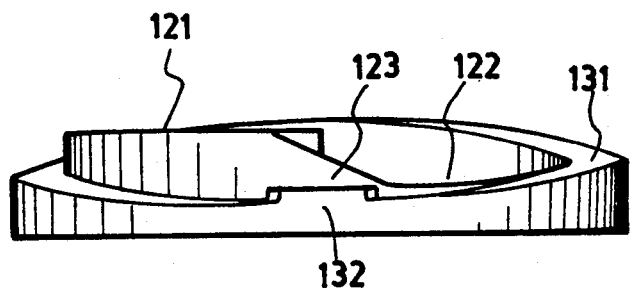
FIG. 7

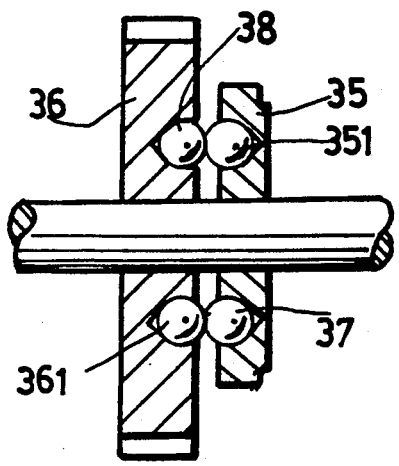
F I G. 9

ELECTRIC DRILL WITH SPEED AND TORQUE CONTROL

BACKGROUND OF THE INVENTION

It is found that the speed controlling means of the prior art electric drill utilizes a push rod to change gears so as to adjust the output speed while the torque controlling means thereof is regulated by another push rod. However, since the two means are controlled by two separate knobs, it will cause much inconvenience in use and furthermore, the construction is complicated thereby increasing the cost and making it difficult for maintenance.

It is, therefore, an object of the present invention to provide an electric drill with speed and torque control which may obviate and mitigate the above-mentioned drawbacks.

SUMMARY OF THE INVENTION

This invention relates to an improved electric drill with speed and torque control.

It is the primary object of the present invention to provide an electric drill with speed and torque control which utilizes a single adjuster ring to control the output speed and torque.

It is another object of the present invention to provide an electric drill with speed and torque control which is easy in operation.

It is still another object of the present invention to provide an electric drill with speed and torque control which is simple in construction.

It is still another object of the present invention to provide an electric drill with speed and torque control which is facile in assembly, It is a further object of the present invention to provide an electric drill with speed and torque control which has a long service time.

BRIEF DESCRIPTION OF THE DRAWINGS

FIG. 5 is a top plan view of the adjuster ring of the drill;

FIG. 6 is a sectional view taken along line A—A of FIG. 5;

FIG. 7 is a front view of FIG. 5;

FIG. 8 is a side view of FIG. 5;

FIG. 9 is a sectional view showing the engagement of the clutch and the driven gear of the drill.

DETAILED DESCRIPTION OF THE PREFERRED EMBODIMENT

Figure 1:
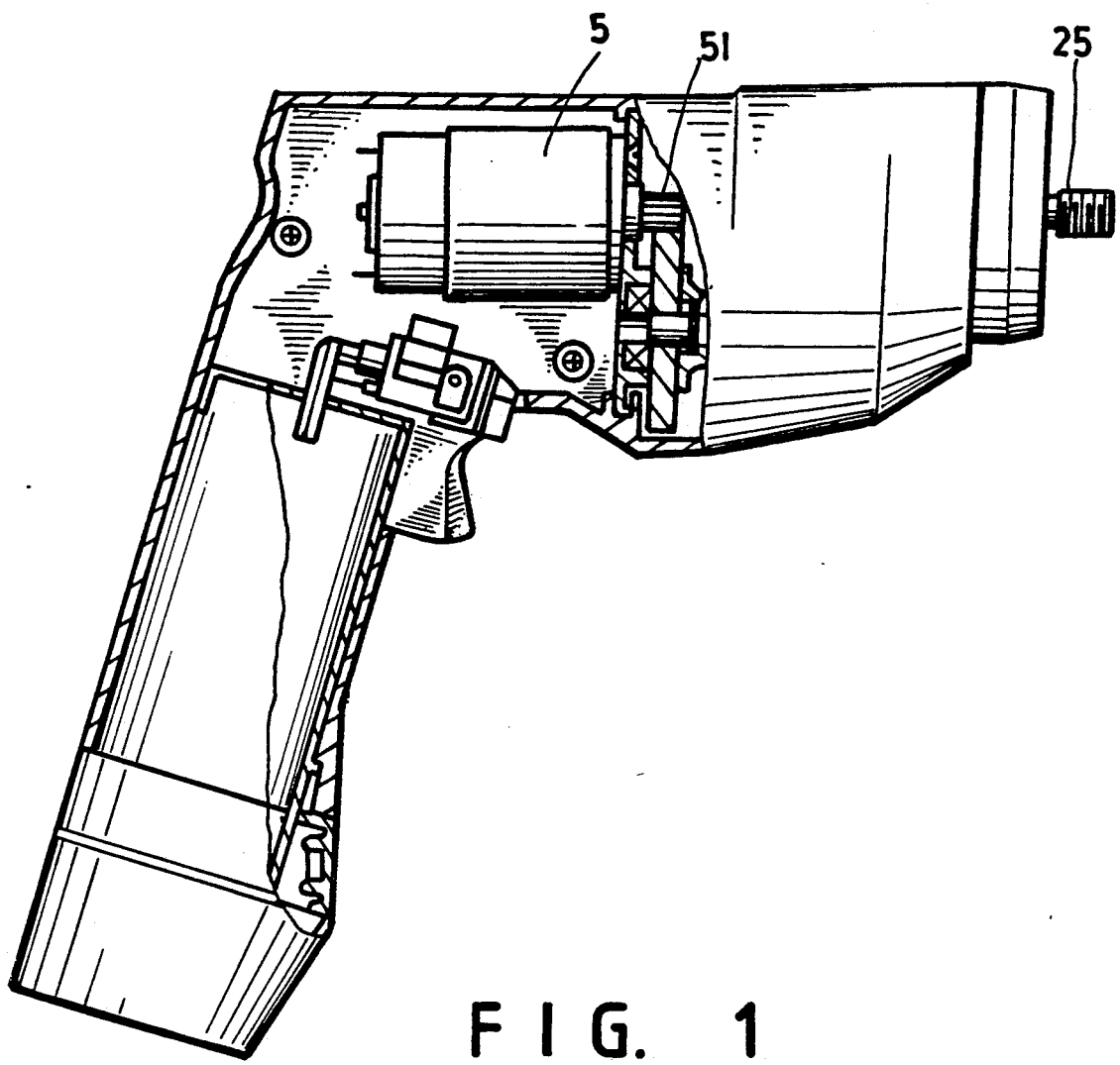
FIG. 1 is a partly sectional view of an electric drill with speed and torque control according to the present invention.
Figure 2:
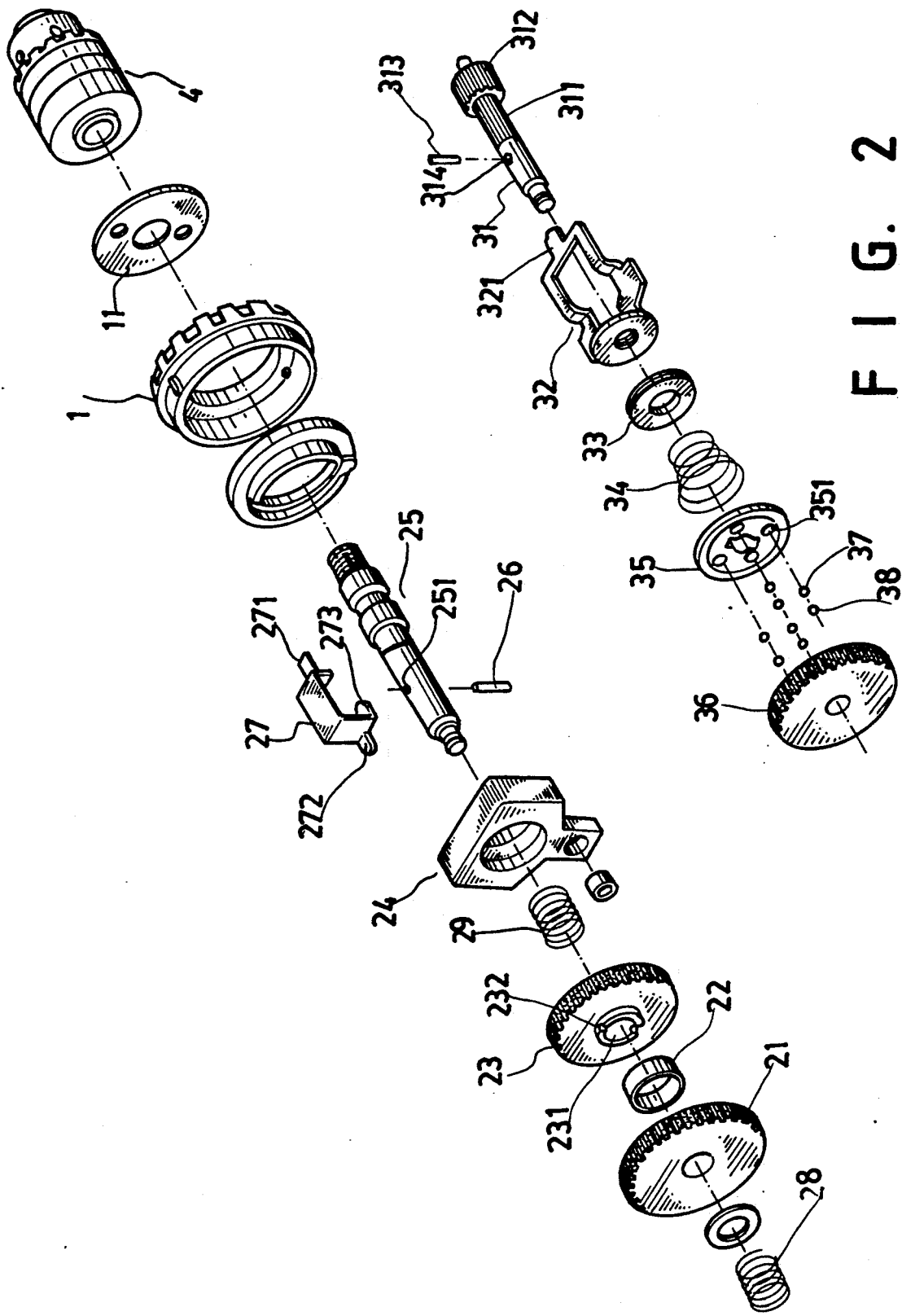
FIG. 2 is an exploded view of the drill with speed and torque control according to the present invention.

With reference to the drawings and in particular to FIGS. 1 and 2 thereof, the electric drill with speed and torque control according to the present invention mainly comprises an adjuster ring 1, a speed control mechanism 2 and a torque control mechanism 3.

Figure 3:
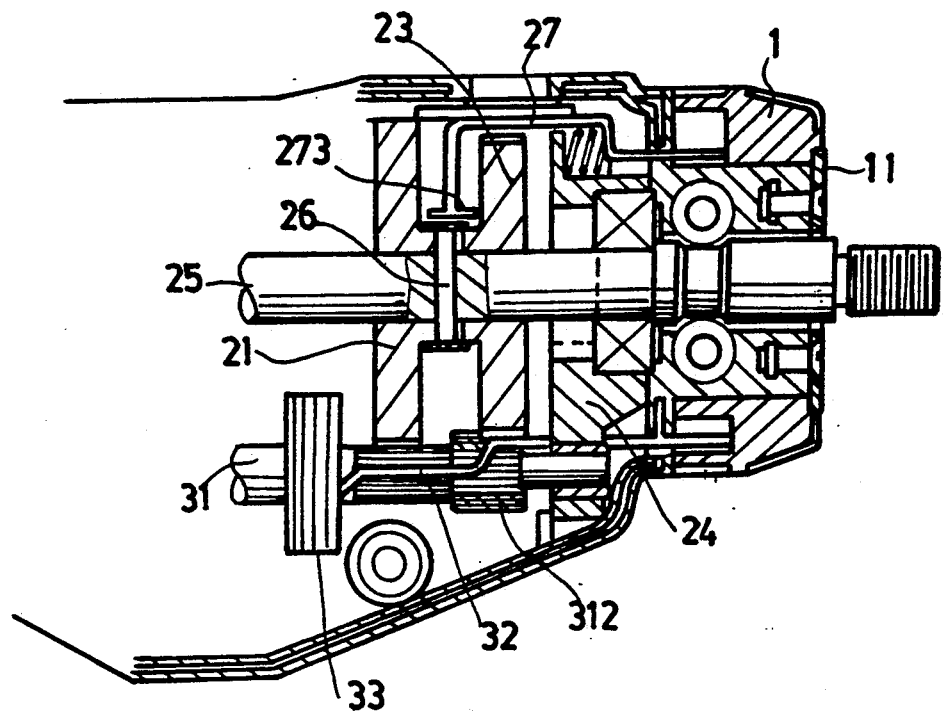
FIG. 3 is a sectional view showing the relative positions of the component parts of the drill when adjusted at low speed.
Figure 4:
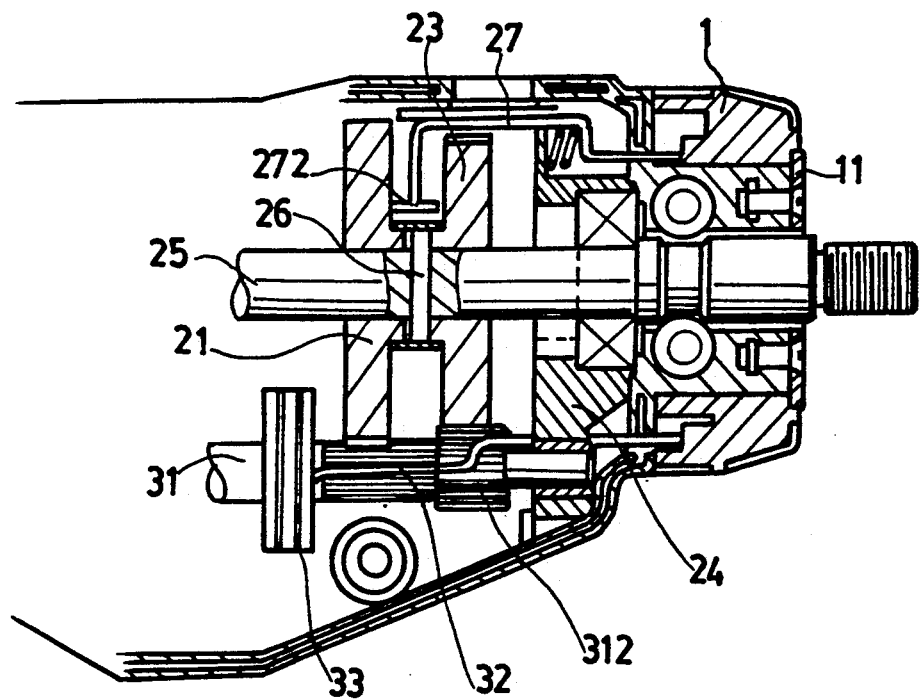
FIG. 4 is a sectional view showing the relative positions of the component parts of the drill when adjusted at high speed.
Figure 10:
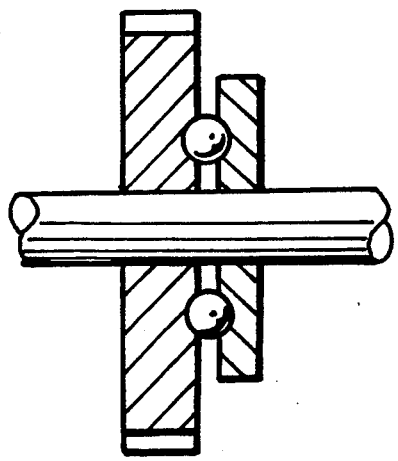
FIG. 10 is a sectional view showing the engagement of the clutch and the driven gear of the prior art drill.

The speed control mechanism 2 comprises a gear 21, a fixed ring 22, a pinion 23, a bearing seat 24, a transmission axle 25, a pin 26, a pusher 27 and two springs 28 and 29. The transmission axle 25 is fixedly connected with a chuck 4 so that it may be rotated therewith. Further, the transmission axle 25 has a hole 251 for receiving the pin 26. The bearing seat 24 is used to support the transmission axle 25 so as to keep it in position. The pinion 23 is put on to the transmission axle 25 and has two opposite notches 232 on a neck 231 at the left side so as to adapt to the pin 26 on the transmission axle 25. The fixed ring 22 is put on to the neck 231 and so the pinion 23 may drive the transmission axle 25 thereby rotating the chuck 4 at high speed. The gear 21 is rotatably and slidably engaged with the transmission axle 25. The pusher 27 is an inverted U-shaped member with a protuberance 271 extending from the right side (with respect to FIG. 2) and an outward leg 272 and an inward leg 273 extending from the left side (with respect to FIG. 3), which is disposed above the pinion 23 in the way such that the legs 272 and 273 are located as close as possible to the transmission axle 25 so that when the pusher 27 is moved leftward, the leg 272 will push the gear 21 leftwardntoo thereby separating the notches 232 of the pinion 23 from the pin 26. Hence, the gear 21 will not drive the transmission axle 25 in the meantime. As the pusher 27 is moved rightward, the gear 21 will be urged to move rightward by the spring 28 thereby engaging the pin 26 on the transmission axle 25.

The clutch 35 is provided at the inner side with four recesses 351 in which are received four steel balls 37 respectively. The driven gear 36 is also provided at the inner side with four recesses 361 which are similar to the recesses 351 in structure and receive four steel balls 38. Therefore, when the driven gear 36 is rotated, the steel balls 38 will urge the steel balls 37 of the clutch 35 thereby causing the clutch 35 to rotate in unison with the the driven gear 36. Since the steel balls 37 and 38 are of high hardness, the life of the clutch and the gear may be prolonged thereby extending the service period of the present invention.

The spline 31 has a plurality of threads 311 engaged with the gear 21 and a gear 312 with the pinion 23. The left end of the spline 31 is connected with the clutch by means of a pin 313 inserted into the hole 314 in the way such that the clutch 35 may still be moved longitudinally. The pressing member 32 is engaged with the spline 31 and bears against the right side of the clutch 35 via a thrust bearing 33 and a spring 34 so that when the presssing member 32 is urged to go leftwards, the clutch 35 will be closely in contact with the driven gear 36. If the pressing member 32 exerts a larger pushing force, the engagement between the pressing member 32 and the driven gear 36 will be more tightened. On the contrary, when the pressing member 32 is released, the engagement between the clutch 35 and the driven gear 36 will become less in tightness. In conclusion, output torque of the drill according to the present invention may be adjusted simply by turning the adjuster ring 1 which utilizes its outer rack 13 to control the pressing force on the pressing member 32. Further, when the torque required by the load is greater than the predetermined output torque of the drill, the driven gear 36 will not be able to drive the clutch 35 and will idle alone thereby preventing the load from being damaged and therefore, protecting the drill and the user as well. It is found that the engagement between the clutch and the driven gear according to the prior art is simply achieved by adapting steel balls to corresponding recesses on the inner side of the clutch and the driven gear (see FIG. 7); however, the recesses will be enlarged in area by wearing with the steel balls so that the engagement therebetween will not be so tight as before and the maxium output torque will be reduced. In case the recesses are further rubbed by the steel balls, the steel balls will even get out of the recesses and the driven gear will be at idling state, losing all functions of the drill. Hence, in comparison with the present invention, the prior art is easily worn out an moreover, the prior art is difficult in manufacture and assembly.

The adjuster ring 1 is rotatably mounted on the transmission axle 25, which is provided with an inner rack 12 and an outer rack 13 for adapting to the protuberance 271 of the pusher 27 and the tail end 321 of the pressing member 32. The inner rack 12 is constituted by a higher path 121 with even height, a lower path 122 with even height, and an inclined path 123 joining said higher path 121 and said lower path 122. The paths 121 and 122 each occupy a range of about 150 degrees. The outer rack 13 is composed of an inclined path 131 and a stopper 132 which is just located against the inclined path 123 of the inner rack 12. Hence, when the higher path 121 of the inner rack 12 bears against the protuberance 271 of the pusher 27, the gear 21 will be pushed away from the transmission axle 25. In the meantime, the pinion 23 will be closely connected with the pin 26 by means of the restoring force of the spring 29 and so the drill will be rotated at high speed. As the adjuster ring 1 is turned, the higher path 121 of the inner rack 12 will move along the protuberance 271 of the pusher 27 and the inclined path 131 of the outer rack 13 will push against the end 321 of the pressing member 32 thereby adjusting the output torque. When the adjuster ring 1 is further turned, the engagement between the inner rack 12 and the protuberance 271 of the pusher 27 will fall down from the higher path 121 to the lower path 122, so that the spring 28 will push the gear 21 towards the chuck 4 thus engaging the gear 21 with the transmission axle 25 and causing the drill to rotate at low speed. At the same time as the adjuster ring 1 is turned, the inclined path 131 of the outer rack 13 will urge the end of the pressing member 32 so as to adjust the output torque. In addition, the adjuster ring 1 may be provided with a calibrated ring for indicating the output speed and torque.

As a consequence, the drill according to the present invention may be adjusted in output speed and torque simply by turning the adjuster ring.

I claim:

1. An electric drill with a speed and torque control comprising:

a speed control mechanism having a transmission axle fixedly connected with a chuck and a hole for receiving a pin;

a pinion disposed on said transmission axle and having a neck on one side thereof, said neck being provided with two notches for adapting to one half of said pin;

a gear rotatably slidably mounted on said transmission axle and having two notches for adapting to the other half of said pin;

a pusher having a protuberance extending at one end and on outward leg and an inward leg extending from the other end and disposed above said pinion in a way that said legs are located as close as possible so that when said pusher is moved leftward, said outward leg will push said gear leftwards thereby separating the notches of said pinion from said said pin;

resilient means forcing said pinion and gear to engage with said pin;

a torque control mechanism having a driven gear connected with an output shaft of a motor and a plurality of recesses in each of which is received a steel ball;

a clutch having a plurality of recesses corresponding to the recesses of said driven gear in each of which is also received a steel ball;

a spline having threads meshed with said gear and a gear engaged with said pinionn and fixedly connected at the end with clutch;

a pressing member disposed on said spline;

resilient means fitted between said clutch and said pressing member for urging said clutch against said driven gear;

an adjuster ring rotatably mounted on said transmission axle, said adjuster ring having at the inner side with an inner rack and an outer rack adapting to said pusher and an end of said pressing member so that when said adjuster ring is turned, said gear will be moved to engage or disengage from said transmission axle thereby adjusting output speed and said pressing member will be urged against or away from said driven thereby adjusting output torque.

2. The electric drill with speed and torque control as claimed in claim 1, wherein the inner rack of said adjuster ring is constituted by a higher path with even height, a lower path with even height, and an inclined path joining said higher path to said lower path and said higher path and lower path each occupy a range of about 150 degress whereas the outer rack of said adjuster ring is an inclined path so that output torque may be adjusted no matter when said drill works at high or low speed.

* * * * *